(12) United States Patent  (10) Patent No.: US 6,650,600 B1
Machida et al.  (45) Date of Patent: Nov. 18, 2003

(54) DIGITAL AUDIO DISC RECORDER

(75) Inventors: Kazuhisa Machida, Kawasaki (JP); Atsushi Ishibashi, Kokubunji (JP); Tsugio Endou, Hachioji (JP); Tadahiko Sakamoto, Kawasaki (JP); Hideki Ikeda, Yokohama (JP); Atsushi Oonishi, Yokohama (JP)

(73) Assignee: Denon, Ltd., Tokyo (JP)

( * ) Notice: Subject to any disclaimer, the term of this patent is extended or adjusted under 35 U.S.C. 154(b) by 101 days.

(21) Appl. No.: 09/712,149

(22) Filed: Nov. 15, 2000

(30) Foreign Application Priority Data

Nov. 16, 1999 (JP) .......................................... 11-325695

(51) Int. Cl.$^7$ ........................... G11B 19/00; G11B 27/00
(52) U.S. Cl. .................... 369/24.01; 369/83; 369/47.22
(58) Field of Search ................................ 369/24.01, 83, 369/30.06, 47.22, 47.54, 30.05, 30.19; 700/234; 707/104.1; 428/64.4, 64.3; 345/727; 705/16; 375/220; 725/64, 92, 96

(56) References Cited

U.S. PATENT DOCUMENTS

| | | | |
|---|---|---|---|
| 5,592,511 A | * 1/1997 | Schoen et al. ............... 375/220 |
| 5,649,171 A | * 7/1997 | Craven et al. ............... 395/500 |
| 5,740,134 A | * 4/1998 | Peterson ...................... 700/234 |
| 5,774,435 A | * 6/1998 | Hirano ...................... 369/47.22 |
| 6,011,758 A | * 1/2000 | Dockes et al. ........... 707/104.1 |
| 6,172,948 B1 | * 1/2001 | Keller et al. .................. 369/83 |

* cited by examiner

Primary Examiner—Ali Neyzari
(74) Attorney, Agent, or Firm—Mattingly, Stanger & Malur, P.C.

(57) ABSTRACT

A digital audio disc recorder improves the ability to carry out an editing operation easily and efficiently. A group of keys used for recording and reproduction operations, ten keys and a track selecting key group are arranged on the side of a panel face of a remote commander. Further, audio signals recorded in the editing operation are displayed as a plurality of materials, a jog dial for moving forwardly and rearwardly the plural materials of the displayed audio signals in a time axis direction is arranged on the side of a panel face of the remote commander, a group of keys for selecting the materials are arranged on the depth side, and a group of keys for instructing a method of processing the selected materials are arranged on the depth side.

14 Claims, 16 Drawing Sheets

FIG. 5
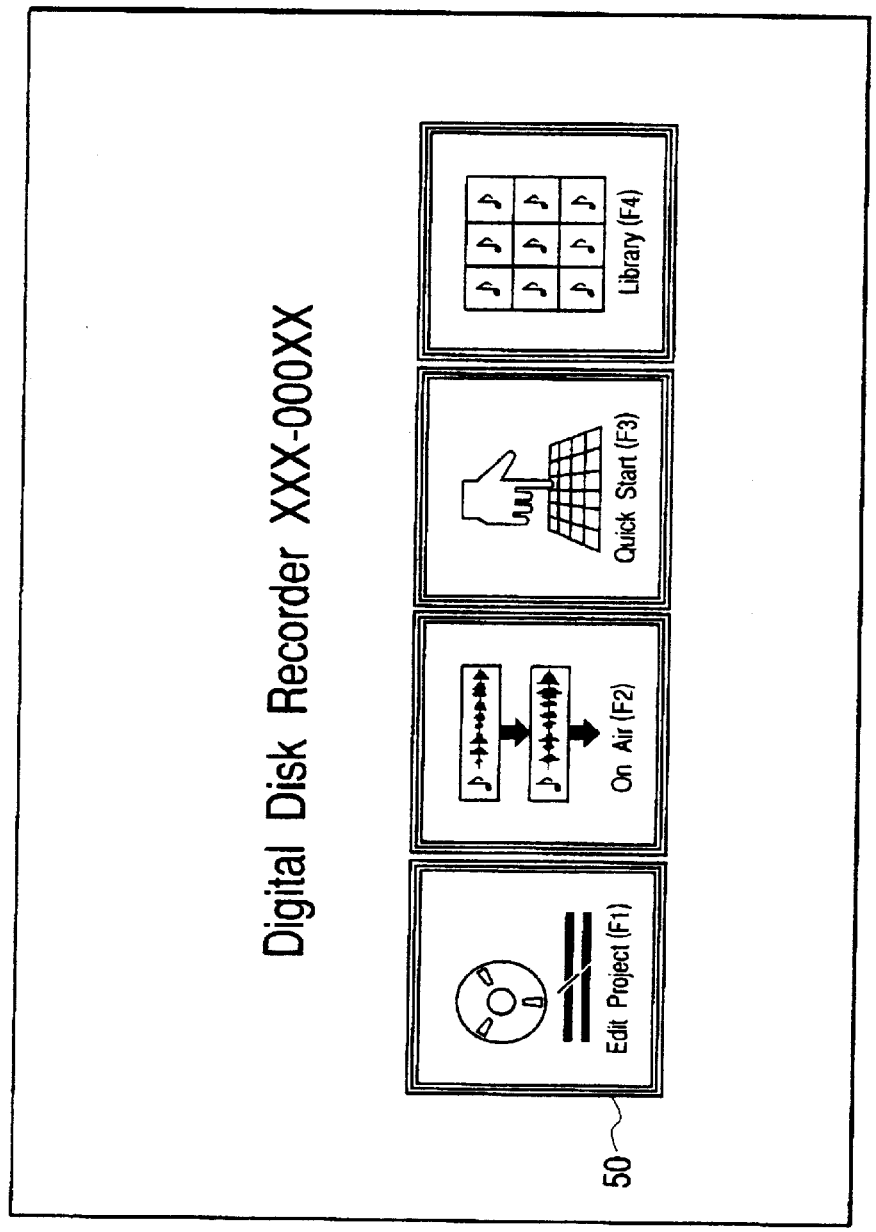
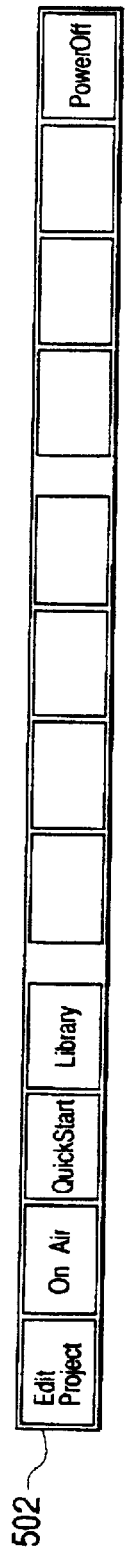

FIG. 6

Edit Project: File Manager

Project File

| Name | Date |
|---|---|
| 12345678.pro | 99/07/09 14:00 |
| Sample00.pro | 99/07/09 14:00 |
| Sample01.pro | 99/07/09 14:00 |
| Sample02.pro | 99/07/09 14:00 |
| Sample03.pro | 99/07/09 14:00 |
| Sample04.pro | 99/07/09 14:00 |
| Sample05.pro | 99/07/09 14:00 |
| Sample06.pro | 99/07/09 14:00 |
| Sample07.pro | 99/07/09 14:00 |
| Sample08.pro | 99/07/09 14:00 |
| Sample09.pro | 99/07/09 14:00 |
| Sample10.pro | 99/07/09 14:00 |
| Sample11.pro | 99/07/09 14:00 |
| Sample12.pro | 99/07/09 14:00 |
| Sample13.pro | 99/07/09 14:00 |
| Sample14.pro | 99/07/09 14:00 |
| Sample15.pro | 99/07/09 14:00 |
| Sample16.pro | 99/07/09 14:00 |
| Sample17.pro | 99/07/09 14:00 |

Create | Open | Copy | Rename | Delete | Quit

FIG. 7

Edit Project: Setup

Project Name  Project1.pro

| | |
|---|---|
| Start Time | 00:00:00;00:00 |
| End Time | 23:59:59;00:00 |
| Sampling Frequency(kHz) | 32, 44.056, 44.1, 47.952, 48, 88.122, 88.2, 95.904, 96 |
| Word Length(bit) | 16, 24 |
| Tc Frame Rate | 24, 25, 29.97nd, 29.97d, 30nd |
| Reference Clock | Internal, Word, AES/EBU, Video |
| Audio Input | Analog, AES/EBU |
| Chase Source | LTC, VITC |

| | |
|---|---|
| Chase Mode | Single, Forward, Both |
| Chase Offset | +00:00:00;00:00 |
| Ext Clock Limit | No Check, 0.05%, 1.0%, 10.0% |
| Track Mode Select | Stereo, Mono-L, Mono-R |
| Tc Generator | Through, ON |
| Tc Generator Offset | +00:00:00;00:00 |
| Take Auto Save | YES, NO |
| Mark 1-5 lock | YES, NO |
| Stop at Mark | YES, NO |
| BroadcastQ | YES, NO |
| Track Name 1 | Track1 |
| 2 | Track2 |
| 3 | V-Track3 |
| 4 | V-Track4 |
| Take Name 1 | Tak  1 |
| Mark Name 1-100 | M  1-100 |

Save | Save As | Reset | Edit | File Manager | Quit

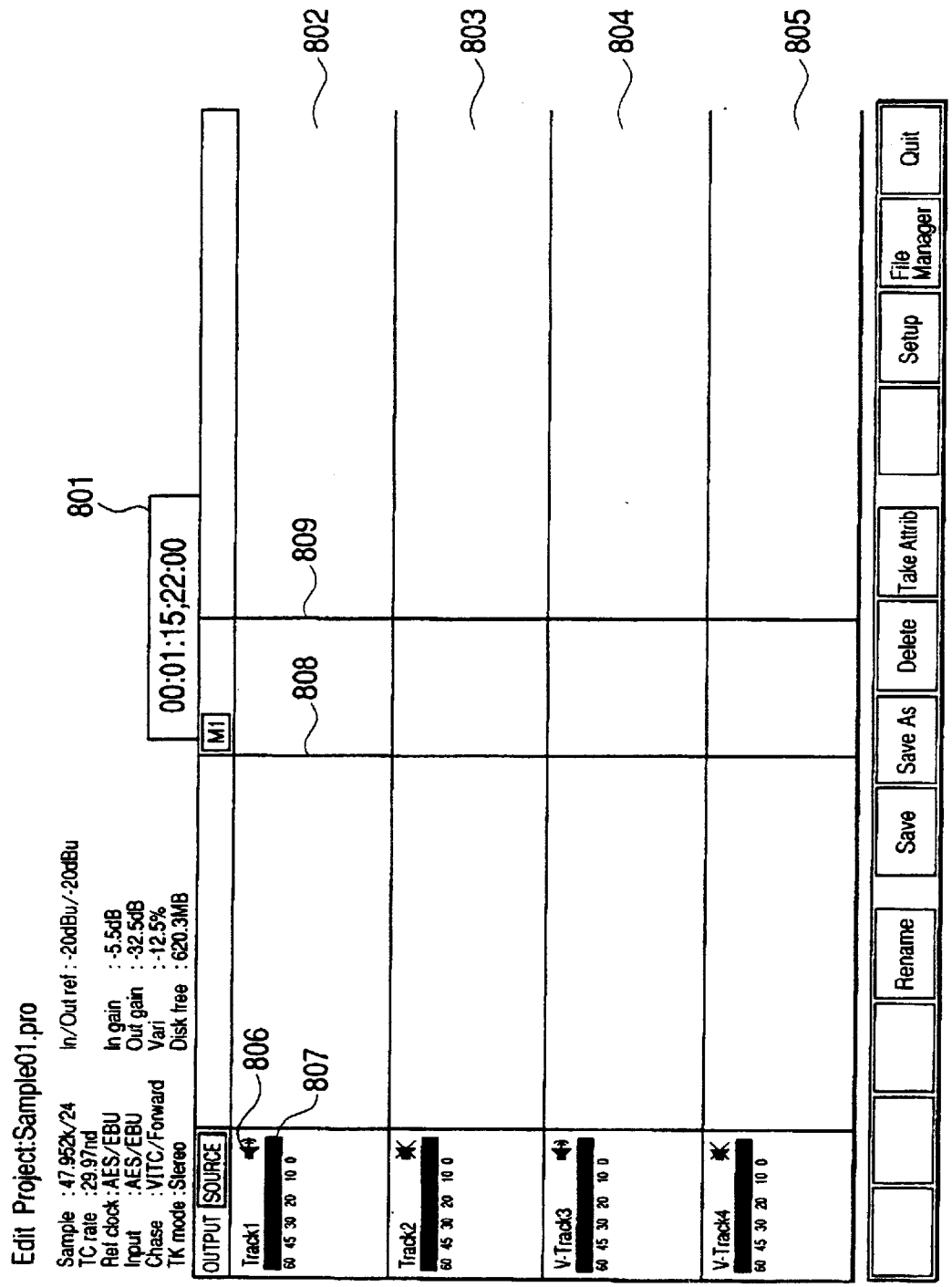

Standard

Selectable

Processable

Hidden Take

Level

Level

TmDistortion

TmDistortion

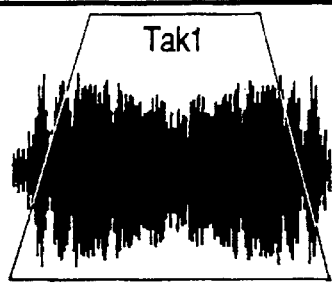
FIG. 13A  Fade
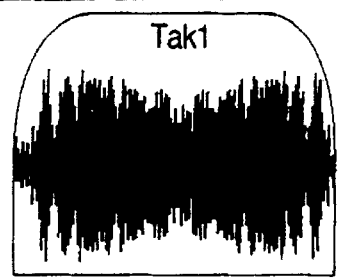
FIG. 13B  Fade Curve
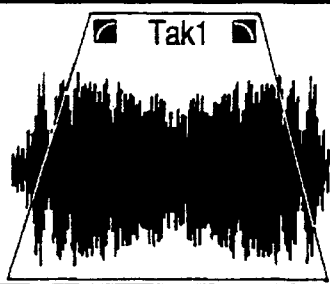
FIG. 13C  Fade Curve
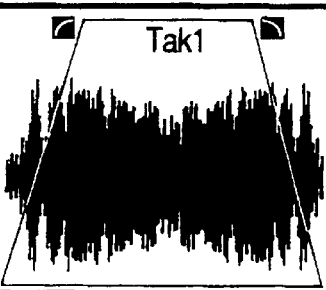
FIG. 13D  Fade Curve PitchShift PitchShift Tminv Symbol sample

FIG. 16

DIGITAL AUDIO DISC RECORDER

BACKGROUND OF THE INVENTION

The present invention relates to a digital audio disc recorder, particularly to a digital audio disc recorder capable of storing inputted analog or digitized audio information such as music, voice or the like in a record medium such as MO, DVD or the like as digital information, editing the audio information stored to the record medium and storing edited information thereof in the record medium, further, reproducing the audio information in accordance with edition information.

Generally, a digital audio disc recorder installed and used at a broadcasting station or the like, is constituted by providing a digital signal processing apparatus for processing an audio signal in digital, a control apparatus for carrying out control of a record medium, control of input/output of operation information and control of interfaces between the digital signal processing apparatus and other apparatus, a keyboard having various keys as a man/machine interface and a display for displaying operational situation or the like. Further, the digital audio disc recorder is capable of carrying out a processing of editing an audio signal such as music, voice or the like, on air processing for reproducing and broadcasting the audio signal, a processing of inserting a signal of special sound and so on.

According to the digital audio disc recorder by the above-described conventional technology, no consideration is given to way of use in the editing operation and there poses a problem in which efficient editing operation is difficult to carry out.

SUMMARY OF THE INVENTION

It is an object of the present invention to provide a digital audio disc recorder resolving the problem of the conventional technology and improving way of use and enabling editing operation easily and efficiently.

According to the present invention, the above-described object is achieved by a digital audio disc recorder having a display for displaying a state of edition, a remote commander having pluralities of keys and buttons for operation and a recording and reproducing apparatus for editing audio signals recorded to the recording and reproducing apparatus and recording edited information thereof to the recording and reproducing apparatus wherein "Min" and "Max" buttons for changing a time axis in displaying the audio signals on the display are provided to the remote commander and by operating the buttons, predetermined minimum and maximum time axes are set by one operation.

Further, the above-described object is achieved by a constitution in which the editing operation of the audio signals is carried out by using the keys and the buttons provided on the panel face of the remote commander and an operation of information control is carried out on the display, further, a group of keys used for recording and reproduction operation are arranged on this side of the panel face of the remote commander.

Further, the above-described object is achieved by a constitution in which the display displays audio signals recorded in an editing operation as a plurality of materials, and the remote commander is arranged with a jog dial for moving the plural materials of the audio signals displayed in the display forwardly and rearwardly in a time-axis direction on this side of the remote commander, a group of keys for selecting the materials are arranged on the depth side and a group of keys for instructing a method of processing the selected materials are provided on the depth side.

Further, the above-described object is achieved by a constitution in which when the materials of the audio signals are displayed to overlap on the display, a frame of the material hidden to a lower side is displayed by a color different from a color of the material displayed on an upper side, shapes of fade-in and fade-out of the material are displayed by icons indicating the shapes, the shapes of fade-in and fade-out of the material can be set in steps, further, the shapes of fade-in and fade-out of the material are selected by selecting the shapes from a plurality of displayed fade curves.

Further, the above-described object is achieved by a constitution in which selection of the material constituting an object of edition and selection of a method of processing thereof can be executed by an arbitrary order, a material constituting the object of edition can be selected by grouping a plurality thereof, the material selectable as the object of edition is displayed by a color different from a color of the other material.

These and other objects, features and advantages of the present invention will become more apparent in view of the following detailed description of the preferred embodiments in conjunction with accompanying drawings.

BRIEF DESCRIPTION OF THE DRAWINGS

FIG. 5 is a view showing a first screen example displayed on a display when a processing of sound recording, edition, reproduction or the like according to an embodiment of the present invention;

FIG. 6 is a view showing a second screen example displayed on a display when a processing of sound recording, edition, reproduction or the like according to an embodiment of the present invention;

FIG. 7 is a view showing a third screen example displayed on a display when a processing of sound recording, edition, reproduction or the like according to an embodiment of the present invention;

FIG. 8 is a view showing a fourth screen displayed on a display when a processing of sound recording, edition, reproduction or the like according to an embodiment of the present invention;

FIGS. 13(a), 13(b), 13(c) and 13(d) are views for explaining a third example of displaying material when the material is processed for edition;

FIG. 16 is a view showing a display example of soft keys.

DESCRIPTION OF THE PREFERRED EMBODIMENTS

A detailed explanation will be given of embodiments of a digital audio disc recorder according to the present invention in reference to the drawings as follows.

Figure 1:
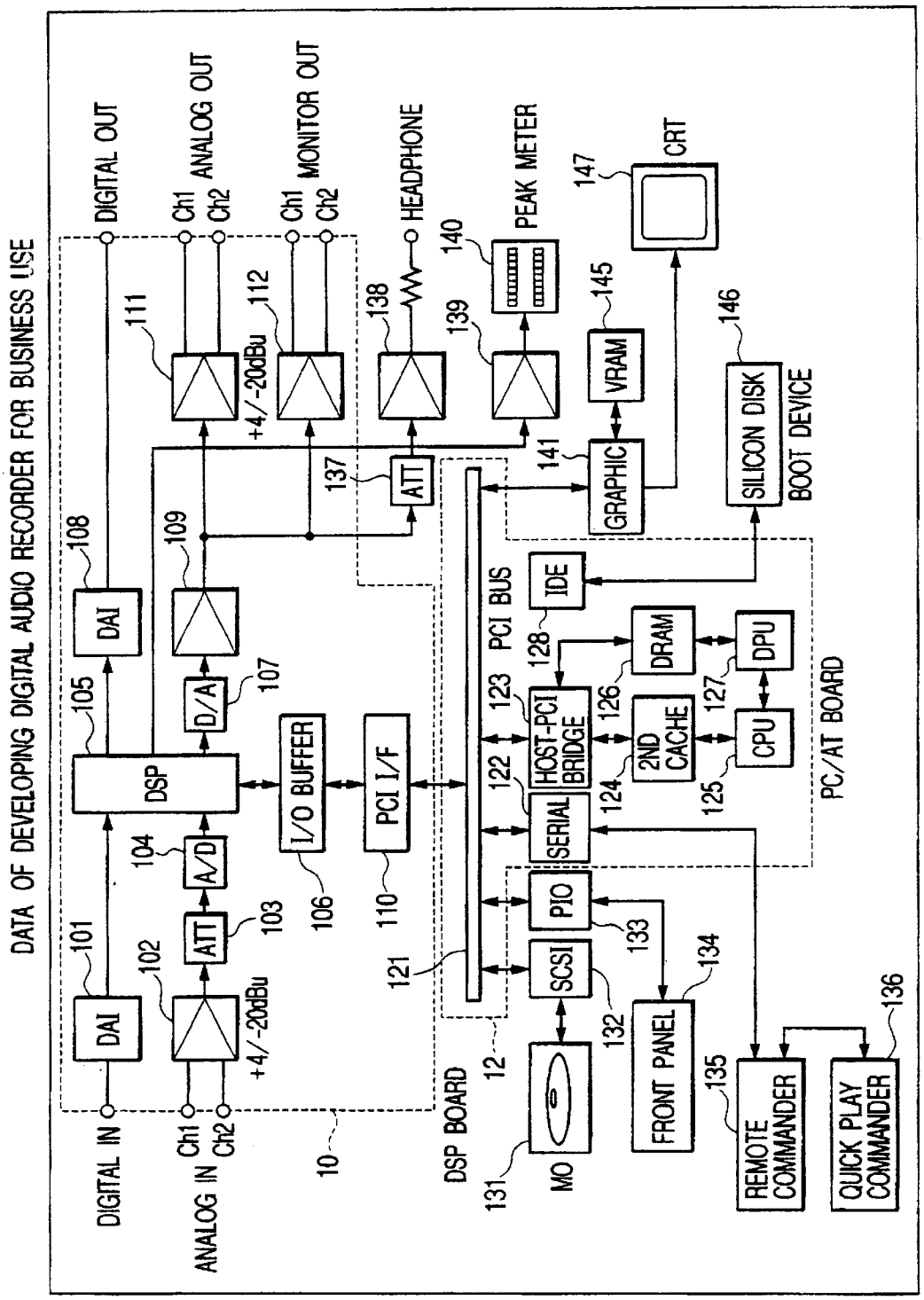
FIG. 1 is a block diagram showing a constitution of a digital audio disc recorder according to an embodiment of the present invention.
Figure 2:
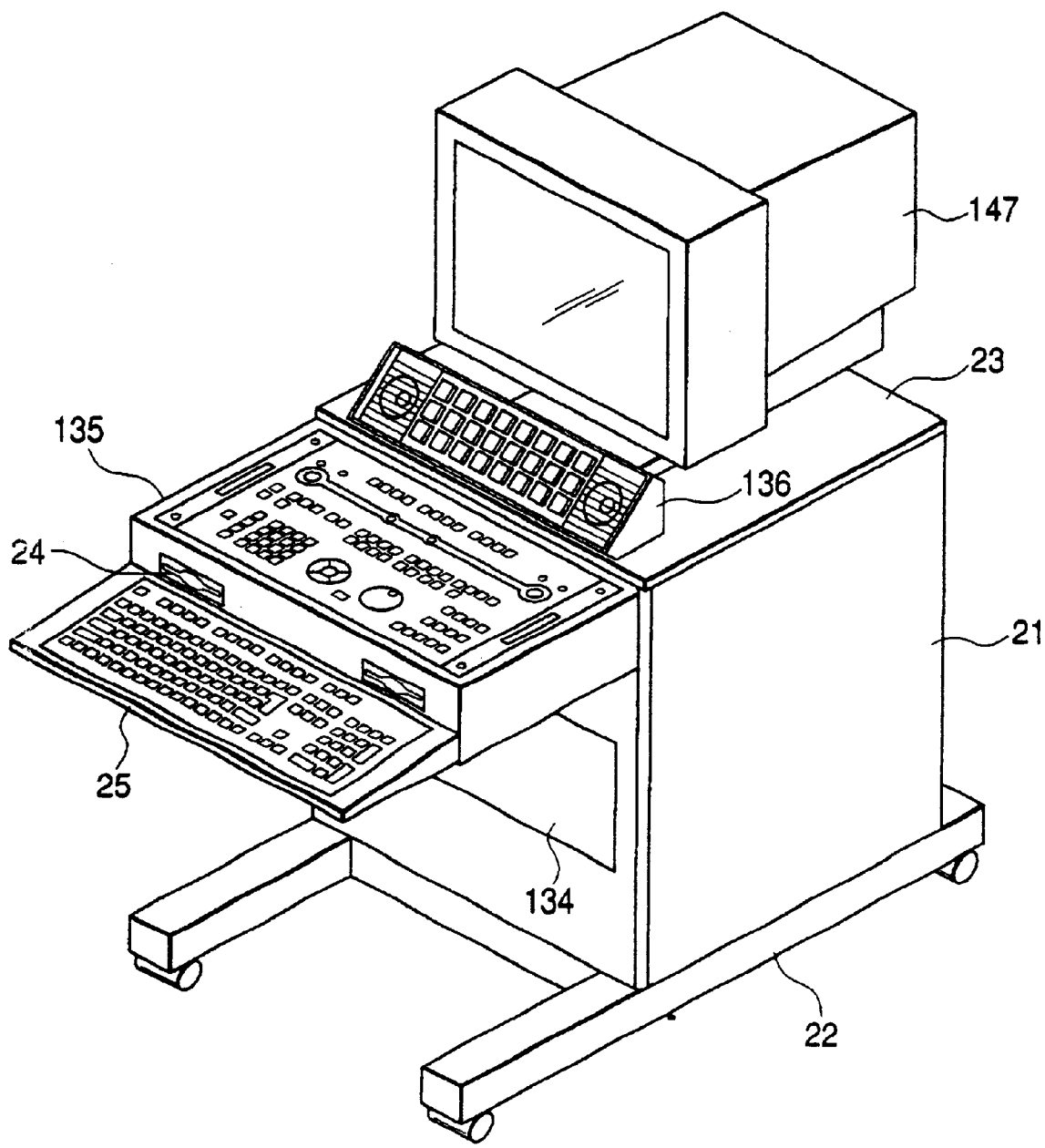
FIG. 2 is a perspective view showing an outlook of the digital audio disc recorder according to the embodiment of the present invention.
Figure 3:
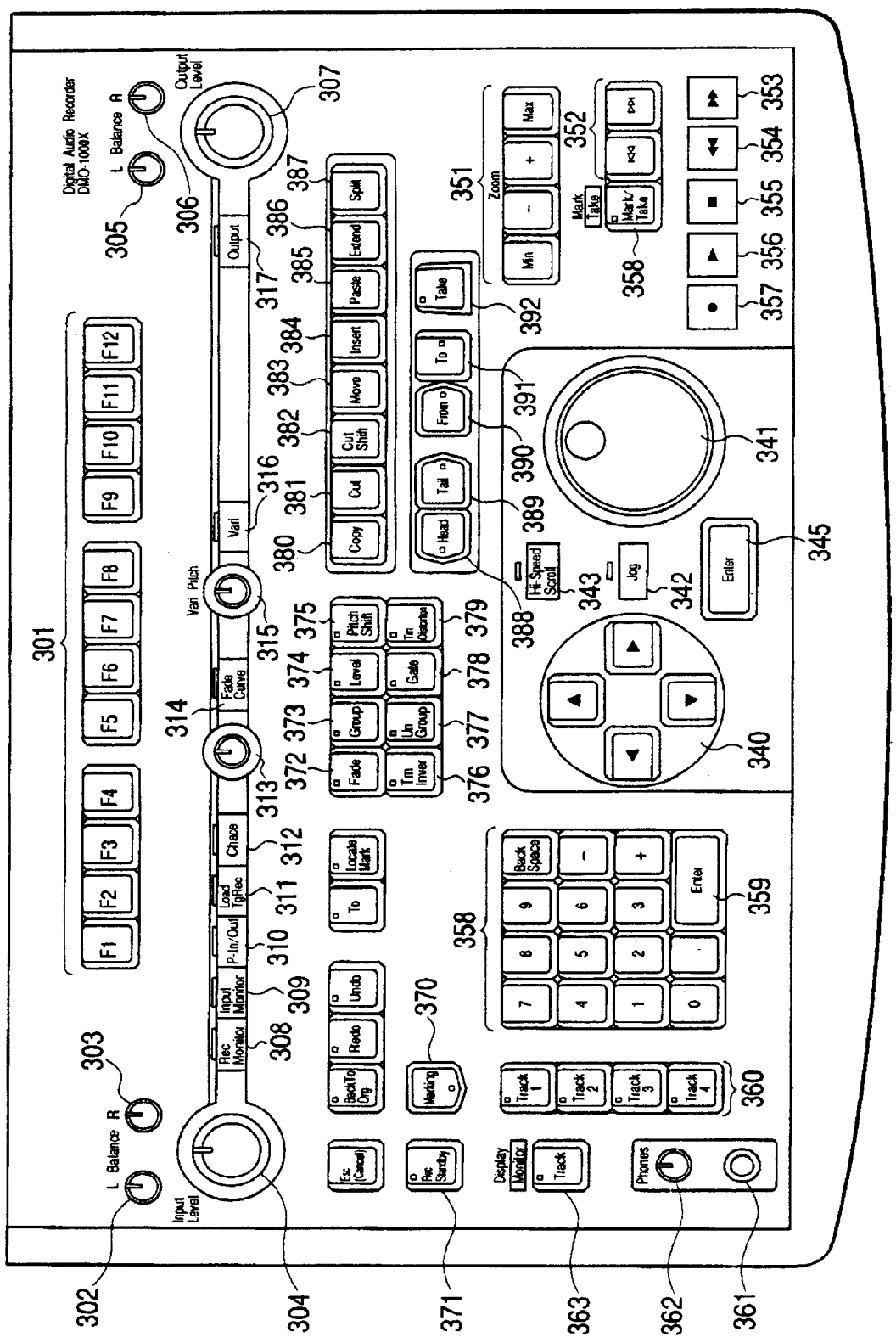
FIG. 3 is a view for explaining key arrangement of a panel face of a remote commander.
Figure 4:
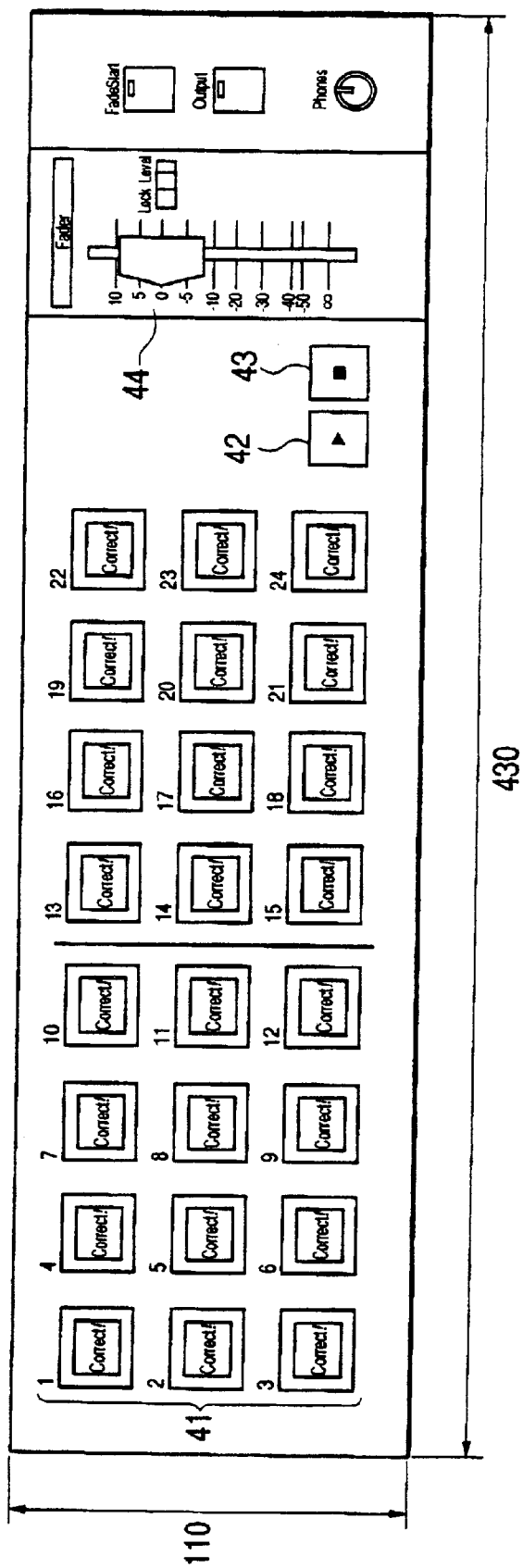
FIG. 4 is a view for explaining key arrangement of a panel face of a quick play commander.

FIG. 1 is a block diagram. showing a constitution of a digital audio disc recorder according to an embodiment of the present invention, FIG. 2 is a perspective view showing an outlook of a digital audio disc recorder according to the embodiment of the present invention, FIG. 3 is a view for explaining key arrangement of a panel face of an operational apparatus and FIG. 4 is a view for explaining key arrangement of a panel face of a quick play commander. An explanation will be given of an outline of a digital audio disc recorder to which the present invention is applied in reference to the drawings as follows. In FIG. 1 through FIG. 4, numeral 10 designates a DSP (digital signal processor) board, numeral 12 designates a PC/AT board, numerals 101 and 108 designate DAI (digital audio interface), numerals 102, 109, 112, 138 and 139 designate amplifiers, numerals 103 and 137 designate ATT (attenuator), numeral 104 designates an A/D (analog/digital converter), numeral 105 designates a DSP, numeral 106 designates an I/O buffer, numeral 107 designates a D/A (digital/analog converter), numeral 110 designates a PCI (peripheral component interconnect) I/F, numeral 121 designates a PCI bus, numeral 122 designates a serial I/O, numeral 123 designates a host PCI bridge, numeral 124 designates a second cache, numeral 125 designates CPU, numeral 126 designates DRAM, numeral 127 designates DPU (digital processing unit) which controls memories, numeral 128 designates IDE (integrated drive electronics), numeral 131 designates an MO device, numeral 132 designates SCSII/O, numeral 133 designates parallel I/O, numeral 134 designates a front panel, numeral 135 designates a remote commander, numeral 136 designates a quick play commander, numeral 140 designates a peak meter, numeral 141 designates a graphic interface, numeral 145 designates V (video) RAM, numeral 146 designates a boot device, numeral 147 designates a display, numeral 21 designates a main body cabinet, numeral 22 designates a leg, numeral 23 designates a top plate, numeral 24 designates an MO drive, numeral 25 designates a JIS keyboard.

As shown by FIG. 1, the digital audio disk recorder according to the embodiment of the present invention, is constituted by providing, as major constituent elements, the DSP board 10 for carrying out various processings such as an edition processing with regard to an audio signal or the like, the PC/AT board 12 for carrying out control of connection to an external apparatus or the like, the MO device 131 for storing an audio signal, edition information or the like, the remote commander 135 used in control of edition, transmission or the like of an audio signal, the quick play commander 136 for inserting a signal of special sound in the midst of transmitting an audio signal and the display 147 for displaying edited information or the like.

According to the embodiment of the present invention constituted as described above, an inputted audio signal of a digital style, is inputted to DSP 105 via DAI 101 and an audio signal of an analog style, is inputted to DSP 105 via the amplifier 102, ATT 103 and A/D 104. DSP 105 receives operation information from the remote commander 135 via the serial I/O 122, the PCI bus 121, PCIIF 110 and the I/O buffer 106, carries out a processing of the inputted digital/audio signal in accordance with the information and records the digital/audio signal to the MO device 131 or outputs the digital/audio signal to outside.

When recording of the inputted digital/audio signal to the MO device 131 is instructed, DSP 105 transmits to and records the signal at the MO device, the digital/audio signal via the I/O buffer 106, PCIIF 110, the PCI bus 121 and SCSII/O 132. Further, when output of the inputted digital/audio signal to an external apparatus is instructed, DSP 105 outputs the digital/audio signal as it is via DAI 108 or outputs the digital/audio signal as an analog signal via D/A 107 and the amplifiers 109 and 111 or 112. The outputted signal is inputted to the peak meter 140 via the amplifier 139 to thereby enable to monitor a signal level thereof. Further, the outputted signal is outputted to a headphone via the attenuator 137 and the amplifier 138 to thereby enable to monitor the signal by an operator. Further, DSP 105 can edit the digital/audio signal recorded in the MO device 131 while reproducing the digital/audio signal and record edited information to the MO device 131 by operation information from the remote commander 135.

The PC/AT board 12 carries out control of various interfaces with regard to processings at DSP 105, described above. According to PC/AT board 12, interface between the DSP board 10 and other apparatus, described above, is carried out via the PCI bus 121. Further, according to the MO device 131, writing and reading of an audio signal and edited information are carried out via SCSII/O 132 and control of drive of the MO device 131 and control of a power source of a total of the apparatus are carried out via the front panel 134 and the parallel I/O 133. Further, interface between the DSP board 10 and the quick play commander 136 for inserting a signal of special sound in the midst of transmission of the audio signal, is carried out via the serial I/O 122. Further the display 147 for displaying information necessary for edition or the like is controlled via DRAM 145 and the graphic interface 141.

The above-described interface control is executed by a processing unit including CPU 125, DRAM 126 as main storage, the storage control apparatus 127, the second cache 124 and the host PCI bridge 123. Further, programs or the like for controlling the processing unit are stored in the boot device 146 constituted of a flash memory or the like, read by IDE 128, stored to DRAM 126 and is used.

According to the digital audio disk recorder, described above, as shown by its outlook in FIG. 2, the display 147 and the quick play commander 136 having a speaker at inside thereof are mounted on the top plate 23 at an upper face of the main body cabinet 21 having the legs 22, the remote commander 135 is detachably attached to a front face of the main body cabinet 21, further, the JIS keyboard 25 is detachably attached to a front face of the remote commander 135 to thereby constitute the digital audio disc recorder. The JIS keyboard 25 is used when input of character is needed in the midst of editing operation, further, when a processing other than edition, for example, a processing by PC is needed. The remote commander 135 is provided with two of the MO drives 24 in the example shown by FIG. 2. Further, inside of the main body cabinet 21 is integrated with the front panel 134 arranged with a power source apparatus, a power source switch and so on. Further, the front panel 134 is also provided with the MO drive 24. The MO drive 24 provided at the front panel 134 is a conventionally installed one and a way of use thereof is deteriorated when the remote commander 135 is attached to the front face of the main body cabinet 21 as in the embodiment of the present invention. Therefore, according to the embodiment of the present invention, the MO drive is provided at the remote commander 135 to thereby facilitate to use thereof. Further, the shape of the main body cabinet 21 is not limited to the illustrated shape but may be a shape of a box or the like capable of being installed above or below a table.

Further, the MO drive 24 provided to the remote commander 135 is constituted to be able to use even when the portion of the remote commander 135 of the embodiment of the present invention is removed and carried to other location and can be used in that case.

FIG. 3 shows key arrangement of a panel face of the remote commander 135 and the remote commander 135 is used in sound recording, edition and reproduction. In FIG. 3, a group of function keys 301 (F1 through F12) arranged at an upper portion of the panel, are used for executing displayed functions in correspondence with buttons allocated with functions usable at the time point and displayed on the display for displaying a state or the like in sound recording, edition and reproduction. At lower portions on left and right sides of the group of function keys 301, there are arranged knobs 302 and 303 for left and right input balance, a knob 304 for adjusting an input level, knobs 305 and 506 for left and right output balance and a knob 307 for adjusting an output level.

Between the knob 304 for adjusting the input level and the knob 307 for adjusting the output level, there are arranged keys or knobs 308 through 317 used for various processings of the present invention. Further, at a portion therebelow, there are arranged a number of keys for calling an individual material referred to as "divided Take", setting a state in correspondence therewith, selecting content of a processing to be added and so on. Further, at a central portion on a lower side thereof, there are arranged a cross cursor 340, a jog dial 341, a switch key 342 for these, a high speed scroll key 343 and an enter key 344. Further, on a right side of the key group, there are arranged a zoom key group 351 as one touch keys for changing level and time axis, skip keys 352 and a group of keys 353 through 357 for fast feed, sound recording, reproduction, stop and so on. Further, on the left side, there are ten keys for inputting numerals, enter keys 358 and 359, a group of track select keys 360 for selecting display or non-display or track, a headphone jack 361, a knob 362 for adjusting a level thereof, a monitor key 363 for setting ON/OFF of monitor used along with the track select key group 360 for selecting display or non-display of track and so on.

The present invention relates to processings of sound recording and edition in the digital audio disc recorder, all of the keys and knobs arranged on the remote commander 135 shown by FIG. 3 are not necessarily used and accordingly, with regard to functions of the keys and the knobs, a description thereof will be given as necessary in the processing operation described below.

Further, a characteristic point of the key arrangement resides in that operation of sound recording and reproduction can be carried out by using an area arranged with the cross cursor 340 and the jog dial 341 and a plurality of keys arranged on the both sides, that is, the keys arranged at the lower portion of the panel face of the remote commander. Further, a characteristic point thereof resides in that a group of keys 388 through 392 used for selecting material (object) for edition are arranged on the upper side of the jog dial, further, a group of keys 372 through 387 for designating a processing method (action) for edition on an upper side thereof.

A panel face of the quick play commander 136 is shown by FIG. 4, is constituted by arranging a key group 41 which is made to correspond with respectives of various materials of short sound, for example, sound of hand clapping, sound of rain, and (effect sound indicating whether an answer to a quiz is correct or not), a reproduction key 42, a stop key 43, a level adjusting knob 44, a fade start key 45, an output ON/OFF key 46 and so on. The quick play commander 136 is used such that when an edited audio signal is reproduced and outputted on air, an operator selects a material of sound intended to output and superposes the material on an audio signal in reproduction at a necessary time point in the process on air.

FIG. 5 through FIG. 10 are views showing examples of screens displayed on the display 147 when processings of sound recording, edition, reproduction and the like are carried out by the embodiment of the present invention and in the following, an explanation will be given of a processing of recording and editing materials according to the embodiment of the present invention in reference to the drawings.

When a power source is switched on the digital audio disc recorder (hereinafter, simply referred to as system) according to the embodiment of the present invention and the system is started, an initial screen shown by FIG. 5 is displayed on the display 147. The initial screen displays a menu for selecting processings in the system according to the embodiment of the present invention and as the menu, there are displayed "Edit Project" for recording and editing materials, "On Air" for combining several of edited audio signals, aligning the audio signals in a temporal order and reproducing the audio signals, "Quick Start" for outputting from the quick play commander 136, audio signals of the special sound held in the quick play commander 136 in correspondence with the keys, for example, sound of hand clapping, (sound indicating whether an answer to a quiz is correct or not), or the like and laughing voice and "Library" for storing and controlling various information such as audio signal materials, edited information and so on.

At a lower portion of the display screen, there are displayed key icons 502 in correspondence with respective keys of the function key group 301 of the remote commander 135. Further, according to the illustrated example, each menu, described above, is allocated with each one of the keys F1 through F4 in the function key group 301 for selecting these menus and the key F12 is allocated with a function of power source OFF.

At this occasion, the operator selects the keys FI of the function key group 301 of the remote commander 135 or moves color indicating the selection to the key icon intended to select by operating the cross cursor 340 in the left and right direction and operates the enter key 345, thereby, processings of recording and editing audio signals by the processing of "Edit Project" can be started and the display screen becomes as shown by FIG. 6.

The screen shown by FIG. 6 is used for selecting to record a new audio signal as a material, edit inedited or edited information which has already been stored in the MO device 131 or the like and proceeding to a successive processing. Further, according to the display screen, there are displayed as a list, a title of the display screen, or "File Manager" in this example and a project file in which names are provided to respectives of the plural files of unedited or edited information which has already stored in the MO device 131. Further, each of the function keys is allocated with a processing operation. According to the example of FIG. 6, the key F1 is allocated with "Create" indicating new formation of file, that is, recording of an inputted audio signal, the key F2 is allocated with "Open" of file, the key F3 is allocated with "Copy" changing name of file, the key F4 is allocated with "Rename" indicating change of name of file and the key F7 is allocated with "Delete" indicating deletion of file. Further, the key F12 is allocated with a function of "Quit" returning to the initial screen shown by FIG. 5. Further, selection of file can be carried out by operating the cross cursor 340 in the up and down direction, further, by operating the key F2 allocated with the function of "Open", a selected file can be called.

Now, when the operator operates the key F1 allocated with "Create" for newly selecting a file by recording a new audio signal as a material, the display screen is for forming a new file as shown by FIG. 7.

Further, the operator inputs various information such as project name or the like to the file of the material intended to record in the screen.

According to the display screen, there are displayed a title of the screen, or "Setup" in this example, input columns of information to be inputted and functions allocated to the function keys.

Although as shown by FIG. 7, there are various kinds of information to be inputted, when the display screen is opened, default values thereof are previously inputted. An explanation will be given of respectives of the information as follows. Further, according to columns described with a plurality of numerical values in the input column, color of a character, or background color of the portion is displayed to differ from other such that one of the plural numerical values is found to be the default value. Further, change of the numerical values of the columns can be carried out by using the cross cursor 340 or the like and selecting other numerical values similar to the case of using the cross cursor 340, mentioned above. Further, the selected numerical value is displayed such that color of character or background color of the portion differs from other.

Start Time and End Time are start time and end time of an audio signal and the time information of these is inputted by using the ten keys. Further, the time information is previously informed to the operator by time codes included in a video signal for synchronizing with a video signal. In the illustrated example, further, "00:00" is indicated after time information and this is a number of frames of the video signal by a unit of second and a time value equal to or smaller than 1 second is represented by the number of frames.

Sampling Frequency (kHz) is a sampling frequency of an inputted audio signal or a sampling frequency of the input signal when an input is digital and a sampling frequency for sampling and digitizing an analog signal when an input is the analog signal. Further, Word Length (bit) indicates a bit length for digitizing sampled information and 16 bits or 24 bits can be selected.

Tc Frame Rate is a number of frames by a unit of second of video recorded with time codes and numbers of frames in cases in which video is of a movie, a television signal of PAL or SECOM or the like, an NTSC television signal and high vision and one of them can be selected. Reference Clock indicates what is a clock constituting a reference, for example, one of signals of a digital audio signal (AES/EBU), a video signal (Video) and the like is selected to use.

Audio Input inputs whether an inputted audio signal is analog (Analog) or digital (AES/EBU). Chase Source indicates an input source for synchronizing with time codes of an external apparatus and either of time code (LTC) in the longitudinal direction of a tape such as a video tape and time code (VITC) included in an image signal is selected.

Chase Mode indicates synchronizing method and there is selected one of three modes of a mode (Single) for synchronizing with a time code of an external apparatus only by once and is thereafter run by itself, a mode (Forward) synchronizing in a case in which video is moved in the forward direction, not synchronizing in a case with regard to the rearward direction, that is, when video is run reversely and a mode (Both) combining the above-described two modes. Chase Offset indicates time when offset time between time of its own and that of an external apparatus in synchronizing is needed and is inputted from the ten keys.

Ext Clock Limit is a shift amount indicating whether an internal clock is used or a report is given to the operator or the like when a result of checking a shift of synchronization from an external apparatus exceeds a predetermined value and one of synchronization check unnecessary (No Check), 0.05%, 1.0%, 10.0% can be selected. Track Mode Select selects whether an inputted and recorded audio signal is a stereo signal (Stereo), left channel monophonic (Mono-L) or right channel monophonic (Mono-R).

Tc Generator designates whether a time code is received from outside and outputted to the outside (Through) or an internal time code is outputted to outside (ON). Further, Tc Generator Offset is time when offset time between internal time code and external time code is needed and is inputted from the ten keys.

Take Auto Save designates whether a name is automatically provided to a recorded material (Take) or the operator is made to input a name (NO) immediately after finishing recording operation. In the case of (NO), a window for inputting the name is displayed. Mark 1–5 Lock sets as (YES) or (NO), whether the lock is set with regard to marks 1 through 5 provided at arbitrary positions in the time direction of an audio signal to be recorded such that mark points are not erroneously updated. Stop at Mark sets as (YES) and (NO), whether the operation is automatically stopped at the mark point in reproduction. BroadcastQ sets as (YES) or (NO), whether a message signal for controlling external apparatus is outputted at the mark point.

Track Name 1 through 4 are names of four tracks and when the track name of default is intended to change, the track name can be changed by inputting the name from the JIS keyboard. Take Name 1 is the name of a material and when name of default is intended to change, the name can be changed by inputting the name from the JIS keyboard. Mark name 1–100 is a flag name and when the flag name of default is intended to change, the name can be changed by inputting the name from the JIS keyboard.

Further, the function keys are allocated with following processing operations. In the example shown by FIG. 7, "Save" of information of setting displayed project is allocated to the key F5, "Reset" for returning set information to a default value is allocated to the key F8 and "Edit" for shifting to editing operation is allocated to the key F9.

Further, the key F11 is allocated with "File Manager" for returning to the screen of the project manager shown by FIG. 6 and the key F12 is allocated with a function of "Quit" for returning to the initial screen shown by FIG. 5.

When the operator operates the key F9 allocated with "Edit" for carrying out editing operation by inputting all of information, explained above, and thereafter recording successively anew audio signal as a material, the display screen displays a state of recording shown by FIG. 8.

On a display screen shown by FIG. 8, there is displayed name of title, "Sample01.pro" in the illustrated example on a left upper side and there are displayed principal ones of information set in FIG. 7, levels of input and output signals set by the remote commander 135, gain of the input and output signals, vacancy capacity of the MO disc and so on therebelow. Further, a time code 801 is displayed at an upper stage of a central portion and there are displayed four of record track areas 802 through 805 whereby an audio signal to be recorded can optically observed at a portion therebelow.

On the left side of four of the track areas 802 through 805, as information common to these tracks, there is displayed whether sound to be monitored is sound of a source or sound reproduced from the disc. In this example, "SOURCE" displayed on a white ground indicates that sound to be monitored currently is sound on the source side and when the monitor is set to an output from the disc by a key of the remote commander, "Disk" is displayed in place of "SOURCE" and sound recorded in recording operation and reproduced immediately can be monitored.

Further, on the left side of each of the track areas, there are displayed name of track and icon 806 in the form of a speaker showing ON/OFF of monitor. When only the icon is displayed, the icon indicates that sound of the track is monitored and when x mark is displayed to overlap the icon, the display shows that sound of the track is not monitored. Further, below the name of track and the icon, there is displayed a level indicator 807 for an audio signal recorded Go the track. Further, a recordable track area is displayed on a bright background and an unused track area is displayed on a background of a dark color. In the illustrated example, it is shown that the track areas 802 and 803 are displayed on the bright background and audio signals are recorded to the tracks. Further, a marker line 808 is displayed at a position for providing a mark to a signal to be recorded and a head cursor 809 is displayed at a position of a head constituting a record position.

Further, "Rename" is allocated to the key F4 of the function key group, "Delete" is allocated to the key F7, "Take Attrib" for displaying details of material is allocated to the key F7, further, "Setup" for returning to the setup screen shown by FIG. 7 is allocated to the key F10. Other keys stay to be allocated with functions the same as those in the case of FIG. 7.

As described above, a number of the tracks to be displayed can be set by the track select key group 360 for selecting display or non-display of track of the remote commander, further, whether the monitor is carried out or not can be set by the monitor key 362 used along with the track select key group 360 for selecting display or non-display of track. Although in the example of FIG. 8, an explanation has been given such that four of the track areas are displayed to include unused ones, an unused track may not be displayed.

Further, in operation of recording and reproducing an audio signal, a relationship of a display length versus a unit time period in the time axis direction of a track area to be displayed, explained above, can be changed by the zoom key group 351 on the remote commander 135. The zoom key group 351 is constituted of four keys of "Min", "−", "+" and "Max" and is provided with a function of a one touch key for changing the time axis, that is, changing an amount of enlarging a waveform. Further, each of "Min" and "Max" each is set with a predetermined amount and by pushing these, the time axis can be changed to these amounts by one touch operation. Further, by simultaneously depressing "Min" and "−", simultaneously depressing "−" and "+" and simultaneously depressing "+" and "Max", the time axis can be changed to a predetermined amount between "Min" and "Max" by one touch operation.

Figure 9:
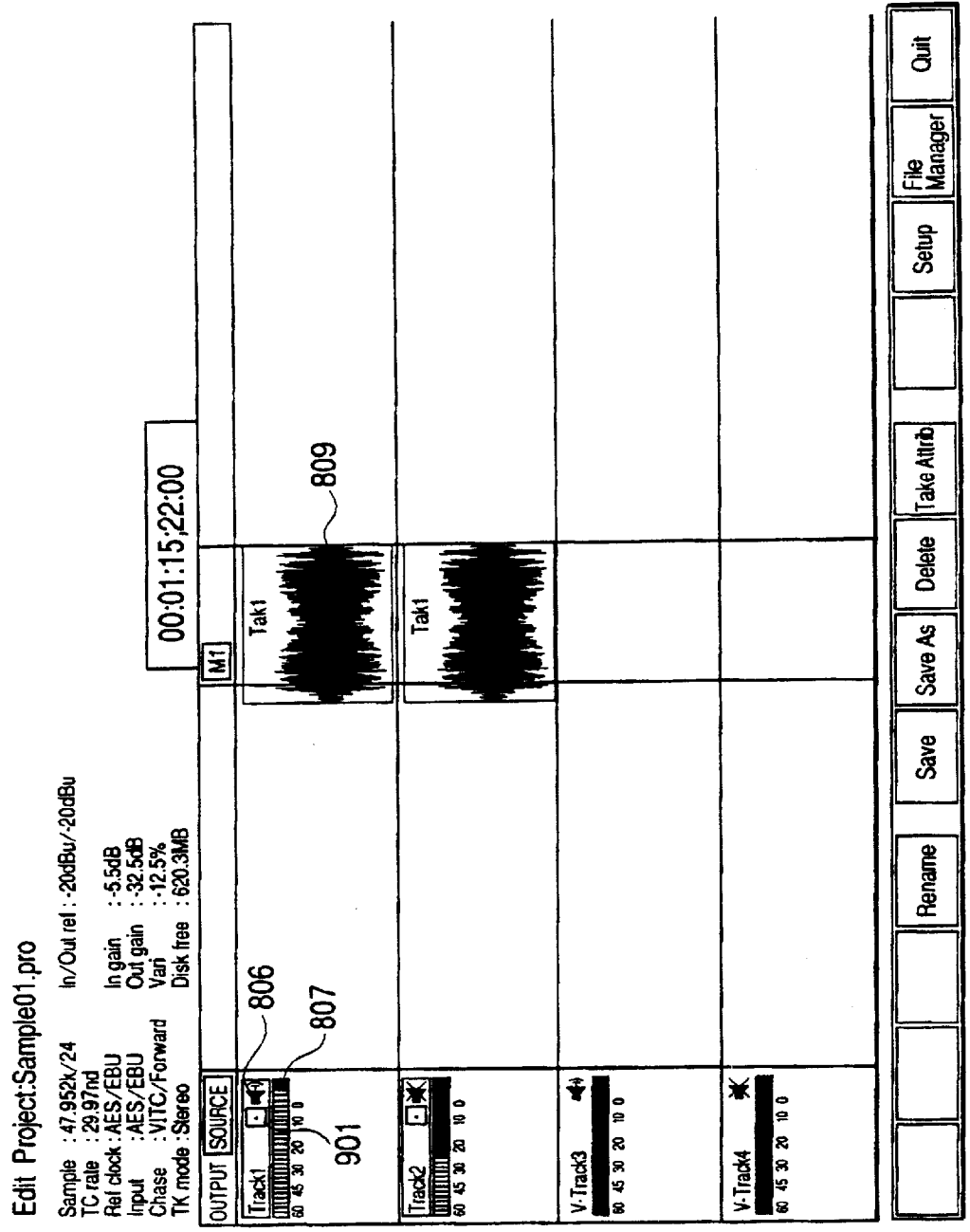
FIG. 9 is a view showing a fifth screen example displayed on a display when a processing of sound recording, edition, reproduction or the like according to an embodiment of the present invention.

At this occasion, when the operator depresses the Rec Standby button 371 of the remote commander 135 as a preparation of starting to record sound, as shown by FIG. 9, there is displayed an icon 901 indicating that the record button is depressed in line with the icon 806 and there is displayed that a recordable state is brought about by changing color of the track area for recording sound into light red color or the like. At this occasion, a signal waveform shown by FIG. 9 does not emerge yet, further, the signal level is not displayed at the level indicator 807.

When the operator simultaneously operates the record button 357 and the forward feed reproduction button 356 of the remote commander 135 in order to start to record sound, by way of route explained in reference to FIG. 1, an inputted analog or digital audio signal is recorded to the MO drive 134. At this occasion, on the display screen, as shown by FIG. 9, it is displayed that a waveform of an inputted signal spout from the position of the head cursor 809 and moves in the left direction. Further, the level is displayed by an aggregation of light spots in the level indicator 807. Further, the audio signal to be recorded is divided on the time axis and a respective division is provided with, for example, Tak n ("n" is numbered successively from 1). Further, when the marking key 370 is depressed, the position is attached with a mark capable of being used for head out or the like as an important position.

When abnormality is caused in the inputted audio signal in the midst of recording sound, mentioned above, a portion displayed on the left upper side for displaying conditions of setting input signals or the like, is displayed by winking of red color or the like to thereby inform the operator that a hazard is caused in an inputted outside signal. Further, switching of output or input of the monitor during sound recording operation, can be carried out by depressing the Rec Monitor 308 of the remote commander 135 or depressing the input Monitor 309. At this occasion, displayed waveform can be switched simultaneously to a waveform of an inputted signal and a waveform of a signal reproduced immediately after having been recorded. Further, when recording of necessary ones of inputted audio signals has been finished, the operator stops the recording operation by the stop button 355. Thereafter, the operator carries out editing operation of providing various operations to the material Tak n attached with the name while reproducing the audio signal which has currently been recorded.

Figure 10:
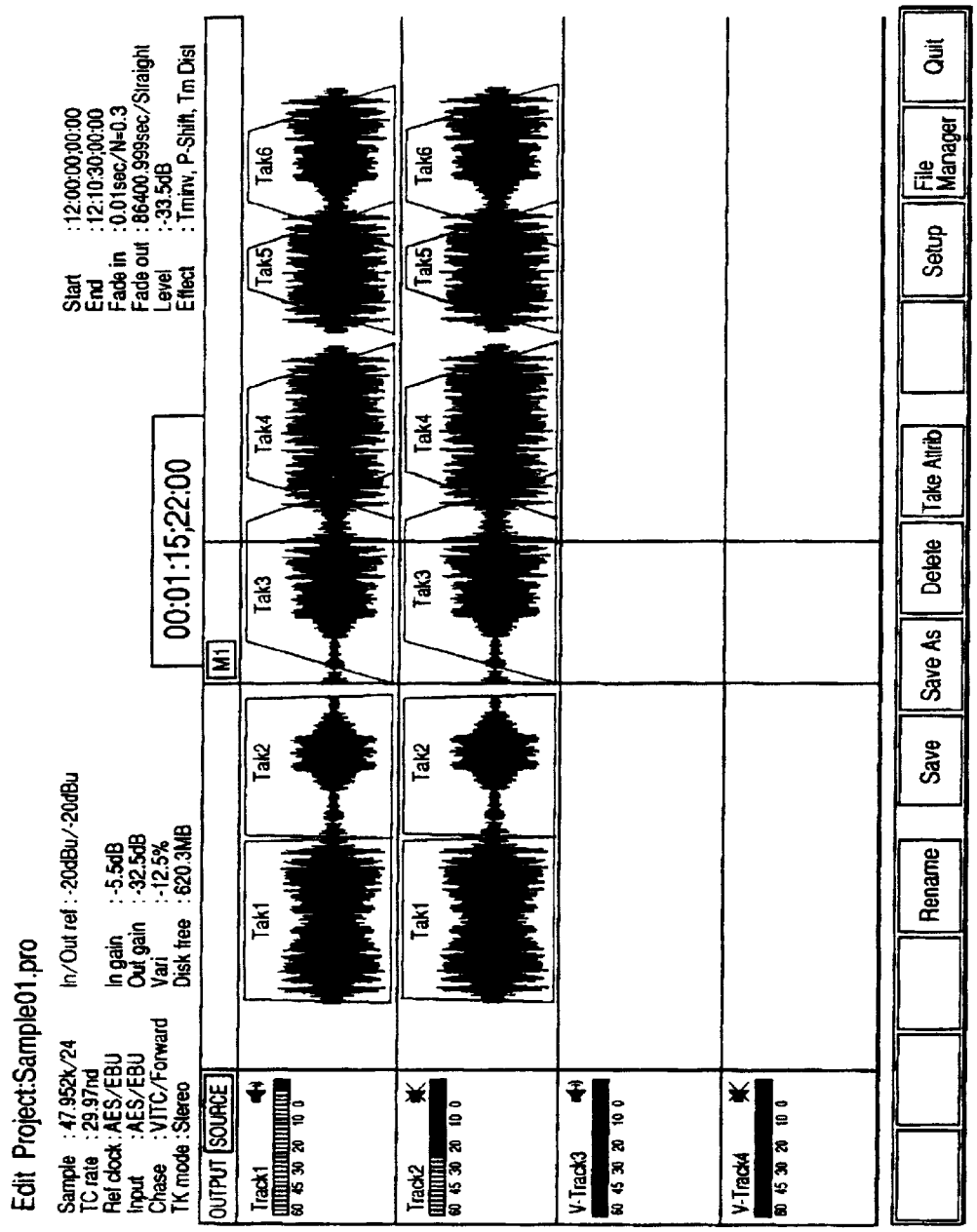
FIG. 10 is a view showing a sixth screen example displayed on a display when a processing of sound recording, edition, reproduction or the like according to an embodiment of the present invention.

When reproduction for edition is started, as shown by FIG. 10, the signal waveform of the recorded material Tak n is displayed. The operator carries out editing operation by providing change of level, change of time axis, delete, copy or the like to the material while selecting the displayed material. In FIG. 10, a material at a position at which the head cursor is disposed is selectable for edition and an area including the material is displayed in light blue color.

Further, when the material is selected, edition with regard to the material can be carried out and the area is displayed in light green color.

Here, an explanation will be given of functions of the keys and the like on the remote commander 135 used for providing various operations to the above-described material Tak n by referring back to FIG. 3.

When reproduction is started, the signal waveform explained above in reference to FIG. 10 is displayed in the track line and the operator can provide various operations to the necessary material Tak n while arbitrarily changing direction and speed of flow of the signal waveform. By rotating the jog dial 341 by the finger in the clockwise direction, the reproduction speed can be set to speed in accordance with the rotation. Therefore, when the jog dial 341 is rotated in the counterclockwise direction, reproduction in the reverse direction can be carried out. Further, reproduction can be carried out at high speed by the high-speed scroll key 343. Further, the jog dial 341 can be provided with a shuttle function by the switch key 342 and reproduction at higher speed can be carried out. Further, the skip keys 352 for instructing skip in the forward direction and the rearward direction, are used along with the Mark/Take select key 358 arranged on the left side of these keys and are used for skipping the position of reproduction by a unit of mark or a unit of Take.

As described above, a material at a position at which the head cursor is disposed is selectable for edition and selection for edition can be designated by the Take key 399, further, a plurality of material can simultaneously be designated by the From key 390 and the To key 391. The Head key 388 and the Tail key 389 are respectively used for designating a front half portion and a rear half portion divided in two by the head cursor as edition section of material. The Fade key 372 is used for providing fade-in and fade-out to the designated material, the Group key 373 is used for constituting one group from a plurality of materials for edition and the UnGroup key is used for disassembling a grouped material.

The Level key 374 is used for changing the level of a signal of a material, the Pitch Shift key 375 is used for changing sound interval without changing a length (time) of a material and the Tm invert key 376 is used for reverting the time axis of a material (reproduction in the rearward direction). Further, the gate key 378 is used for automatically dividing a selected material into a plurality of materials by silencing voice data portions in each of which a state of a set voice threshold continues for a designated time period or more and setting a preroll time period and the Tm Distortion key 379 is used for compressing/expanding the time axis for changing the length (time) without changing the sound interval of a material.

The Copy key 380 is used for copying a material or an arbitrarily designated section of a material to a paste buffer and the Cut key 381 is used for cutting data of a designated section on a material and storing a cut portion to a paste buffer. The Cut Shift key 382 is used for forwarding successive data to a portion of a cut section and storing a cut portion to a past buffer, and the Move key 383 is used for moving a material on the time axis. The Insert key 384 is used for inserting voice data stored in a paste buffer to a position of the head cursor of a selected track. In this case, a material successive to the pasted voice data is pushed back rearwardly by an amount of the pasted voice data. The Extend key 386 is used for prolonging a head or a tail of a pasted material and the Split key 387 is used for dividing a selected material in two at a position of the head cursor.

The operator selects a material or a plurality of materials to be edited and carries out edition of these materials by using the various keys on the remote commander 135, mentioned above. At that occasion, when the key F8 allocated with Take Attrib is operated, detailed information with regard to a material on the head cursor is displayed on a right upper side of the display screen. Further, either of selection of material by the keys 388 through 392 and processing of edition by the keys 372 through 387, that is, designation of processing material may be carried out prior to other thereof and when a plurality of materials are selected, with regard to all of the selected materials, designation and processing can be carried out simultaneously. Further, among key operations for carrying out processing for edition, mentioned above, with regard to the operation which needs to set numerical values or the like, after operating the keys, windows for setting the numerical values are opened in the display screen and the numerical values can be set by using the ten keys 358. Further, when there are a plurality of choices although the choices cannot be represented by numerical values, for example, when fade is set, there is opened a window selectably displaying a plurality of fade curves having different shapes.

Further, in processing materials for edition, there is a case in which contiguous materials completely overlap each other or portions thereof overlap each other. In such a case, according to an embodiment of the present invention, a display is carried out such that the overlap can be recognized by displaying a frame or color of a waveform of a material which is overlapped and hidden to be different from color of a waveform of a signal which is to be disposed on this side.

Although according to the above-described processing of edition, an explanation has been given such that the edition is carried out with a recorded unedited material as an object, the edition can similarly be carried out also in the case in which the edition is carried out by reproducing an edited material. In this case, reedited information may be preserved by attaching other name thereto or may be preserved under the same name.

After having been edited, edited data thereof is recorded to the MO disk recorded with an original audio signal along with a name of a material and when reproducing the audio signal, the original signal is processed in accordance with the edited data.

FIG. 11(a) through FIG. 14(d) are views of explaining several of processings of material for edition, mentioned above, with regard to display examples of materials when processings are carried out and an explanation will be given thereof as follows.

Figure 11A:
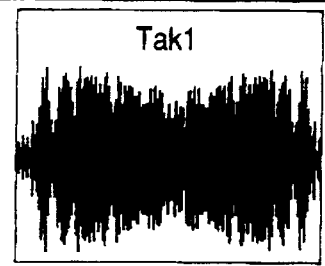
FIGS. 11(a), 11(b), 11(c) and 11(d) are views for explaining a first example of displaying material when the material is processed for edition.

A waveform shown in FIG. 11(a) indicates a standard material Tak 1 and an audio signal to be recorded is constituted and recorded as a group of materials in which a number of such materials are aligned in the time axis direction. When the recorded material group is reproduced for edition, the group of materials are reproduced and displayed as shown by FIG. 11(b).

As has already been explained, a material at a position at which the head cursor is disposed, or in the case of the illustrated example, material Tak 2 is displayed with a material area in light blue color in a track area in light read color as selectable for edition and a waveform included therein is displayed in deep blue color. According to the example shown in FIG. 11(b), a material area is formed in a trapezoidal shape to thereby indicate that fade-in and fade-out, mentioned later, are provided. Further, when the material Tak 2 is selected by the above-described key operation, as shown by FIG. 11(c), the material area is displayed in light green color and the waveform is displayed in deep green color. The operator can carry out various processings for edition with regard to the selected material Tak 2 under the state.

Figure 11B:
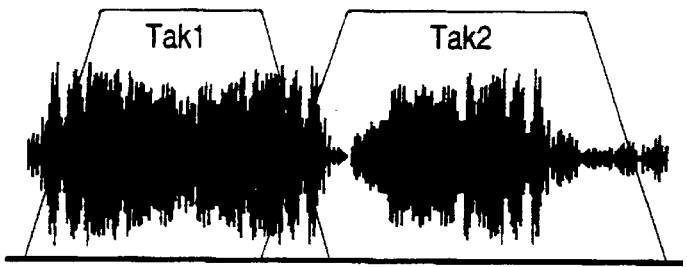
Figure 11C:
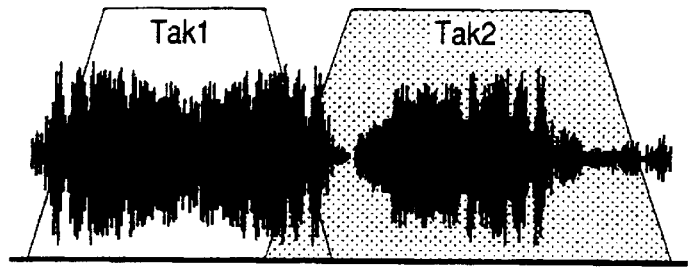
Figure 11D:
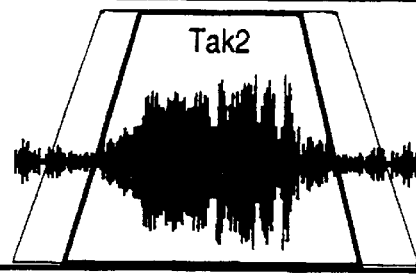

Further, in FIG. 11(b) and FIG. 11(c), with regard to the portion where the two materials overlap each other, the operator can recognize that the materials overlap each other by being displayed by other color. Further, FIG. 11(d) shows a state of a case in which the two materials overlap each other by providing shift processing or the like to one of the materials, color or a waveform of a hidden material is displayed by other color and the material area is displayed by a frame in read color.

Figure 12A:
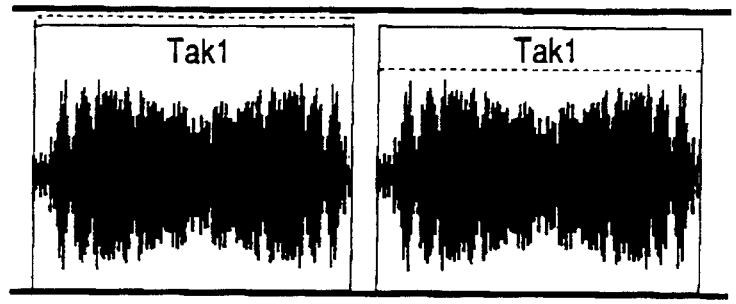
FIGS. 12(a), 12(b), 12(c) and 12(d) are views for explaining a second example of displaying material when the material is processed for edition.
Figure 12B:
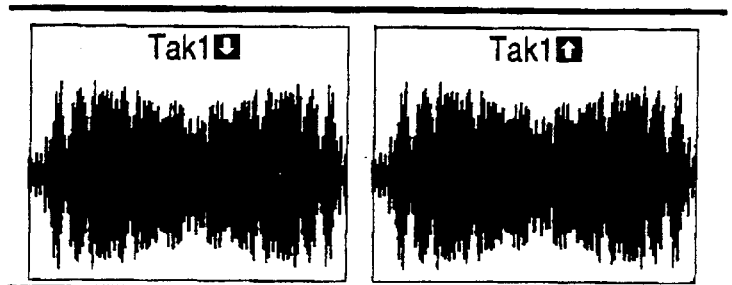

FIG. 12(a) and FIG. 12(b) show a display example when level change is provided to a material and according to an example of FIG. 12(a), a level of an original signal is indicated by a dotted line and a length in a height direction of an area of a material is changed and displayed such that whether the level is moved up or down from the dotted line can be recognized. Further, in FIG. 12 (a), the left side is a display example when the level is moved down and the right side is a display example when the level is moved up. Further, FIG. 12(b) shows moving up and down of the level by displaying the movement by icons by arrow marks, the left side is a display example when the level is moved down and the right side is a display example when the level is moved up. Further, FIG. 12(c) and FIG. 12(d) show display examples when time distortion is provided to a material and in either of the cases, the left side shows a case of shortening the length of the time axis and the right side shows a case of prolonging the length of the time axis.

Figure 12C:
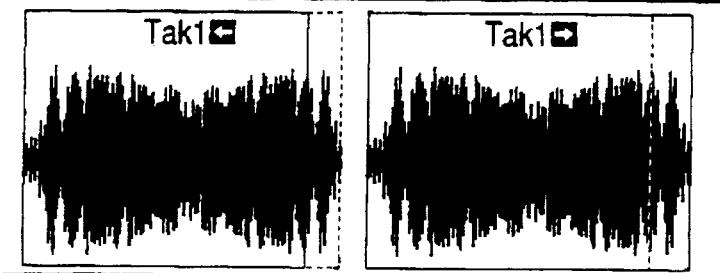
Figure 12D:
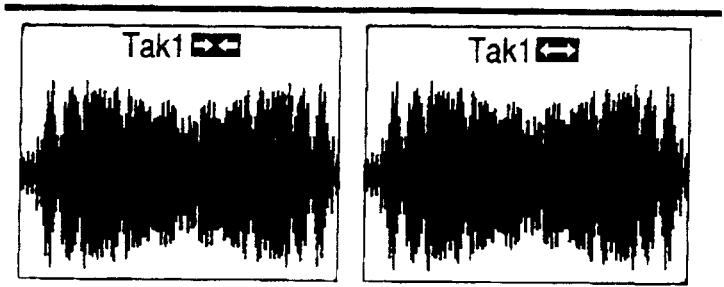

Further, in FIG. 12(c), a time length of an original signal is indicated by a dotted line, a length in a time direction of an area of a material is changed and displayed such that whether the time axis is shortened or prolonged from the dotted line can be recognized and a direction of change is shown to display by icons by arrow marks. Further, FIG. 12(d) is an example of display showing that whether the time axis is shortened or prolonged can be recognized by icons by arrow marks.

FIG. 13(a) through FIG. 13(d) show display examples of a state of a material provided with processings of fade-in and fade-out and examples shown in FIG. 13(a) and FIG. 13(b) are examples in which a material area is displayed by using shapes of fade curves per se. Further, examples shown in FIG. 13(c) and FIG. 13(d) are examples of showing material areas as "fade" in a linear shape and showing to display a shape of an actual fade curve at inside and outside of the material area as icons indicating the fade curve.

Figure 14A:
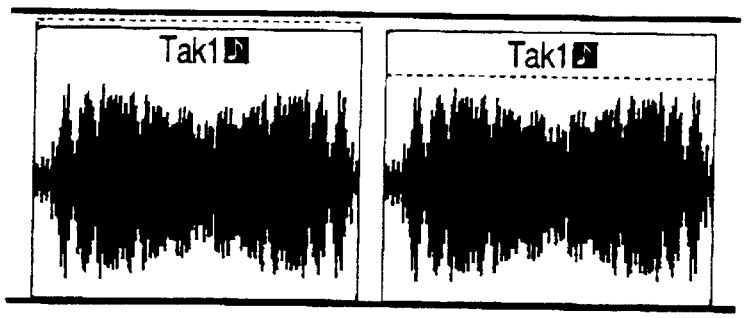
FIGS. 14(a), 14(b), 14(c) and 14(d) are views for explaining a fourth example of displaying material when the material is processed for edition.
Figure 14B:

FIG. 14(a) and FIG. 14(b) show display examples when Pitch Shift is provided to a material and according to an example shown in FIG. 14(a), a pitch of an original signal is indicated by a dotted line and a length in a height direction of an area of a material is changed and displayed such that a pitch is increased or decreased from the dotted line. Further, in FIG. 12(a), the left side is a display example, when the pitch is decreased and the right side is a display example when the pitch is increased. Further, FIG. 14(b) shows to display increase and decrease of the pitch by icons by arrow marks, the left side is a display example when the pitch is decreased and the right side is a display example when the pitch is increased. Further, according to these examples, to facilitate to discriminate from the case of changing the level, the change of pitch is indicated by displaying icons by signs of sound intervals.

Figure 14C:
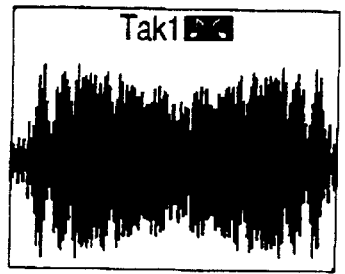

An example shown by FIG. 14(c) shows a display example when time invert, that is, a processing of inverting the time axis is provided to a material and time invert is shown to carry out by icons of sound intervals directed inverse to each other.

Figure 14D:
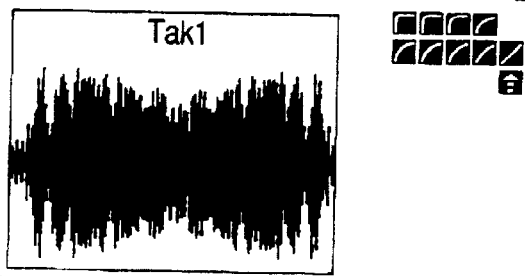

FIG. 14(d) shows an example of enabling to select fade curves when the above-described fade is provided, at a proximity of a material of providing fade, a number of fade curves having different shapes are displayed and by selecting one of them, setting of fade is carried out. Although according to the illustrated example, only shapes of fade-in are illustrated, by selecting one of them, a symmetric fade-out curve can automatically be set. Further, when a fade-in curve and a fade-out curve are intended to set to have different shapes, curves of both may be displayed and selected, or a group of fade-in curves and a group of fade-out curves may be displayed in turn such that one of them is selected and thereafter, other is selected.

Figure 15:
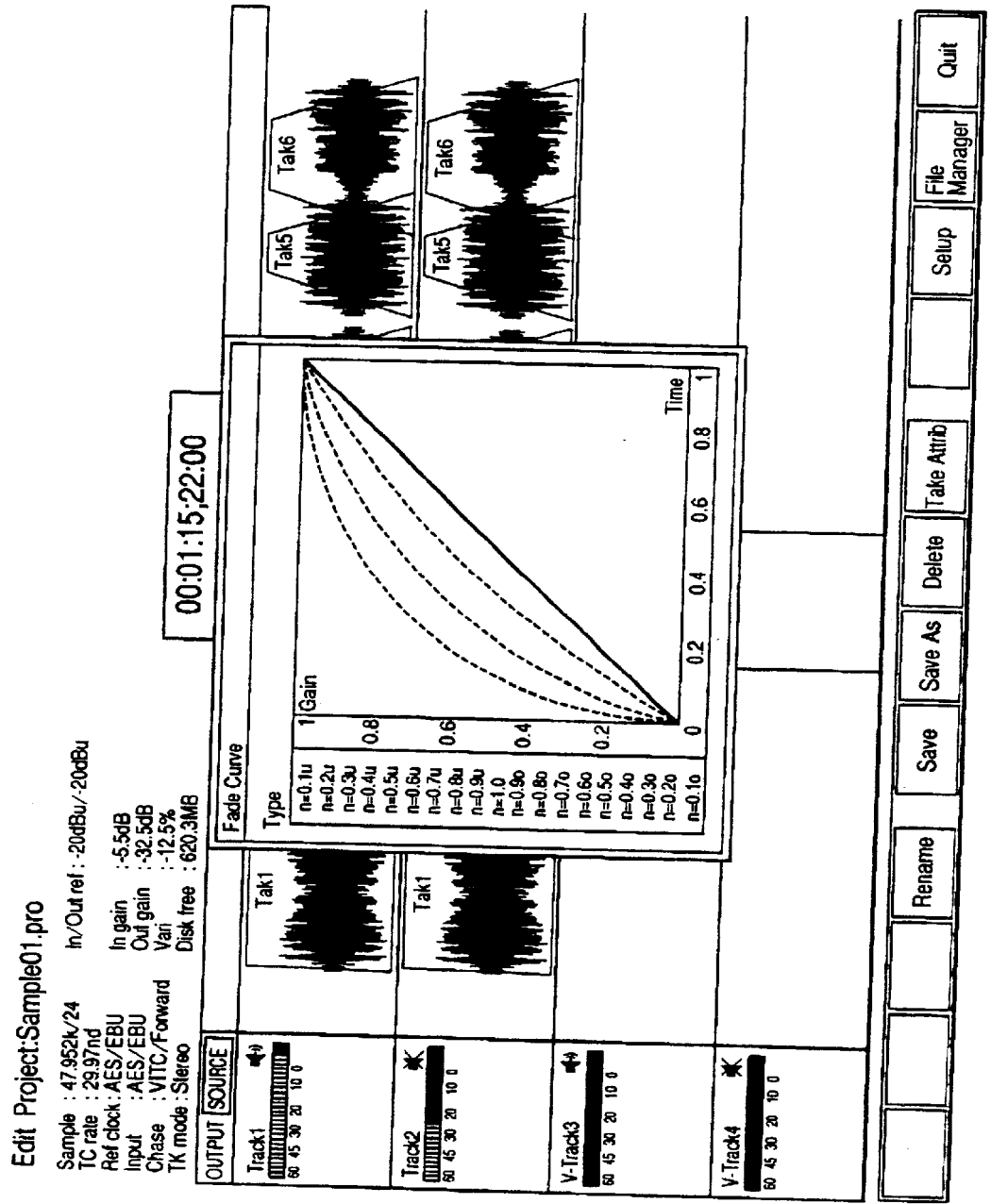
FIG. 15 is a view for explaining other method of selecting a fade curve when fade is operated.

FIG. 15 is a view for explaining other method of selecting a fade curve when fade is provided and according to the example, when setting of a fade curve is instructed, a window indicating a number of fade curves is displayed and one of them is selected by a cross key or the like. Also according to the example, by selecting one of shapes of fade-in, a symmetrical fade-out curve can automatically be set. Further, when a fade-in curve and a fade-out curve are intended to set to have different shapes, curves of both may be displayed and selected, or a group of fade-in curves and a group of fade-out curves may be displayed in turn such that one of them is selected and thereafter, other thereof is selected.

Further, a fade curve by a straight line may be displayed in the above-described window showing fade curves, a curve may be changed by using up and down keys of a cross cursor and may be selected when a desired curve is constituted.

Although according to the above-described embodiment of the present invention, when character information needs to input in the midst of the processing of edition, the JIS keyboard is used, according to the present invention, when the JIS keyboard is not connected, soft keys may be displayed on a display screen of a display and character information can be inputted by touching the soft keys by the finger. In this case, although the way of use is deteriorated in comparison with the case of using the JIS keyboard, character information is not inputted so frequently and accordingly, the problem is insignificant.

Figure 16:
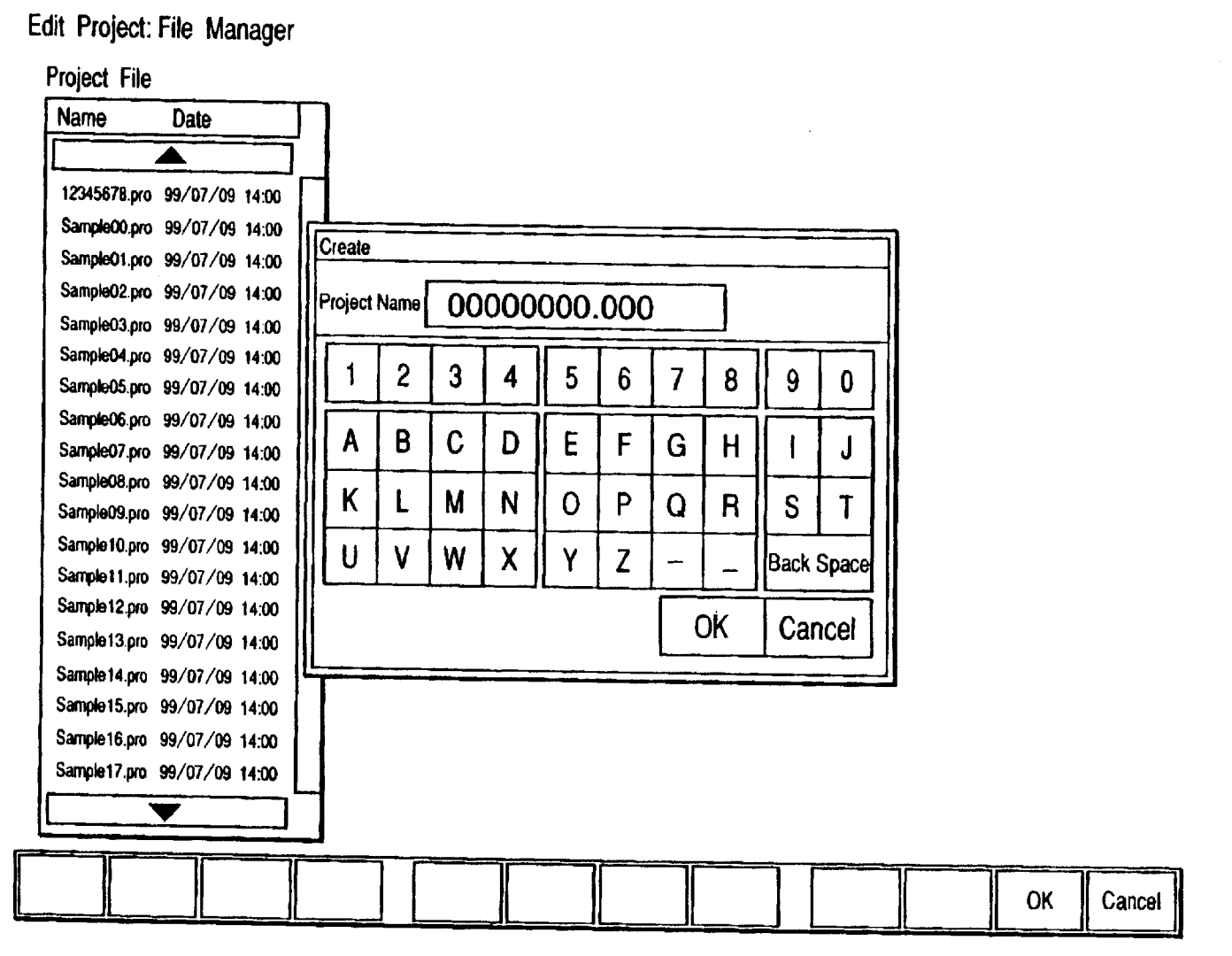

FIG. 16 shows a display example of soft keys displayed in this case and an explanation thereof is not particularly needed. The illustrated example is shown simply as an example and the example may be displayed in a style of drain.

Although according to the above-described embodiment of the present invention, an explanation has been given such that an audio signal is recorded and edited information is recorded to the MO device, recording of the audio signal and recording of the edited information may be carried out to a record apparatus of other style such as a DVD apparatus, a magnetic disc apparatus having a large capacity or the like.

As has been explained, according to the present invention, there can be provided a digital audio disc recorder capable of improving way of use and carrying out editing operation easily and efficiently.

While the present invention has been described above in conjunction with the preferred embodiments, one of ordinary skill in the art would be enabled by this disclosure to make various modifications to this embodiment and still be within the scope and spirit of the invention as defined in the appended claims.

What is claimed is:

1. A digital audio disc recorder comprising:

a display for displaying a state of edition, a remote commander having pluralities of keys and buttons for operation, a recording and reproducing apparatus, and an editor for editing audio signals recorded in the recording and reproducing apparatus, and recording edited information thereof in the recording and reproducing apparatus;

wherein the display displays audio signals recorded in an editing operation as a plurality of materials; and the remote commander is arranged with a jog dial at a first position on the remote commander, for moving the plural materials of the audio signals displayed in the display forwardly and rearwardly in a time-axis direction, a first group of keys for selecting the materials at a second position on the remote commander, and a panel face arranged with a second group of keys for instructing a method of processing the selected materials at a third position on the remote commander, the first position being between a center of the remote commander and a user edge of the remote commander, and between the user edge of the remote commander and the second and third positions.

2. The digital audio disc recorder according to claim 1: wherein buttons of "Min" and "Max" for changing a time axis in displaying the audio signals on the display are provided to the remote commander and by operating the buttons, predetermined maximum and minimum axes are set by one operation.

3. The digital audio disc recorder according to claim 1: wherein the editing operation for editing the audio signals is carried out by using the keys and the buttons provided on the panel face of the remote commander and an operation of information control is carried out on the display.

4. The digital audio disc recorder according to claim 1: wherein a third group of keys used for recording and reproduction operations are arranged at a fourth position on the panel face of the remote commander, the fourth position being between the center of the remote commander and the user edge of the remote commander.

5. The digital audio disc recorder according to claim 1: wherein when the materials of the audio signals are displayed to overlap on the display, a frame of the material hidden to a lower side is displayed by a color different from a color of the material displayed on an upper side.

6. The digital audio disc recorder according to claim 1: wherein shapes of fade-in and fade-out of the material are displayed by icons indicating the shapes.

7. The digital audio disc recorder according to claim 6: wherein the shapes of fade-in and fade-out of the material can be set in steps.

8. The digital audio disc recorder according to claim 6: wherein the shapes of fade-in and fade-out of the material are selected by selecting the shapes from a plurality of displayed fade curves.

9. The digital audio disc recorder according to claim 1: wherein selection of the material constituting an object of edition and selection of a method of processing thereof can be executed by an arbitrary order.

10. The digital audio disc recorder according to claim 9: wherein a material constituting the object of edition can be selected by grouping a plurality of the materials.

11. The digital audio disc recorder according to claim 1: wherein the material selectable as the object of edition is displayed by a color different from a color of the other material.

12. A digital audio disc recorder comprising:

a display for displaying a state of edition, a remote commander having pluralities of keys and buttons for operation, a recording and reproducing apparatus, and an editor for editing audio signals recorded to the recording and reproducing apparatus and recording edited information thereof to the recording and reproducing apparatus;

wherein a "Min" button for changing a time axis in displaying the audio signals on the display is provided to the remote commander and by operating the "Min" button, a predetermined minimum time axis is set by one operation.

13. A digital audio disc recorder comprising:

a display for displaying a state of edition, a remote commander having pluralities of keys and buttons for operation, a recording and reproducing apparatus, and an editor for editing audio signals recorded to the recording and reproducing apparatus and recording edited information thereof to the recording and reproducing apparatus;

wherein a "Max" button for changing a time axis in displaying the audio signals on the display is provided to the remote commander and by operating the "Max" button, a predetermined maximum time axis is set by one operation.

14. A digital audio disc recorder comprising:

a display for displaying a state of edition, a remote commander having pluralities of keys and buttons for operation, a recording and reproducing apparatus, and an editor for editing audio signals recorded to the recording and reproducing apparatus and recording edited information thereof to the recording and reproducing apparatus;

wherein respective "Max" and "Min" buttons for changing a time axis in displaying the audio signals on the display are provided to the remote commander and by operating the buttons simultaneously, a predetermined time axis between the maximum time axis and the minimum time axis is set.

* * * * *